United States Patent [19]

Lankenau et al.

[11] 4,132,587

[45] Jan. 2, 1979

[54] EVAPORATOR

[75] Inventors: Henry G. Lankenau, New Providence; Alfonso R. Flores, Westfield, both of N.J.

[73] Assignee: Ecodyne Corporation, Lincolnshire, Ill.

[21] Appl. No.: 799,817

[22] Filed: May 23, 1977

[51] Int. Cl.² ............................................. B01D 1/06
[52] U.S. Cl. ............................... 159/27 A; 159/28 A; 159/28 R; 165/172
[58] Field of Search ................ 159/17 R, 27 R, 27 A, 159/27 B, 28 R, 28 A; 165/172

[56] References Cited

U.S. PATENT DOCUMENTS 1,436,739  11/1922  Webre .................................. 159/27 A Primary Examiner—Norman Yudkoff
Attorney, Agent, or Firm—Charles M. Kaplan; Joel E. Siegel

[57] ABSTRACT

Apparatus for evaporating liquids by heat transfer from a condensing vapor through long vertical tubes in which the film thickness of condensed vapors on such tubes is reduced by removal of such vapors intermediate the ends of the tubes.

2 Claims, 4 Drawing Figures

U.S. Patent
Jan. 2, 1979
4,132,587
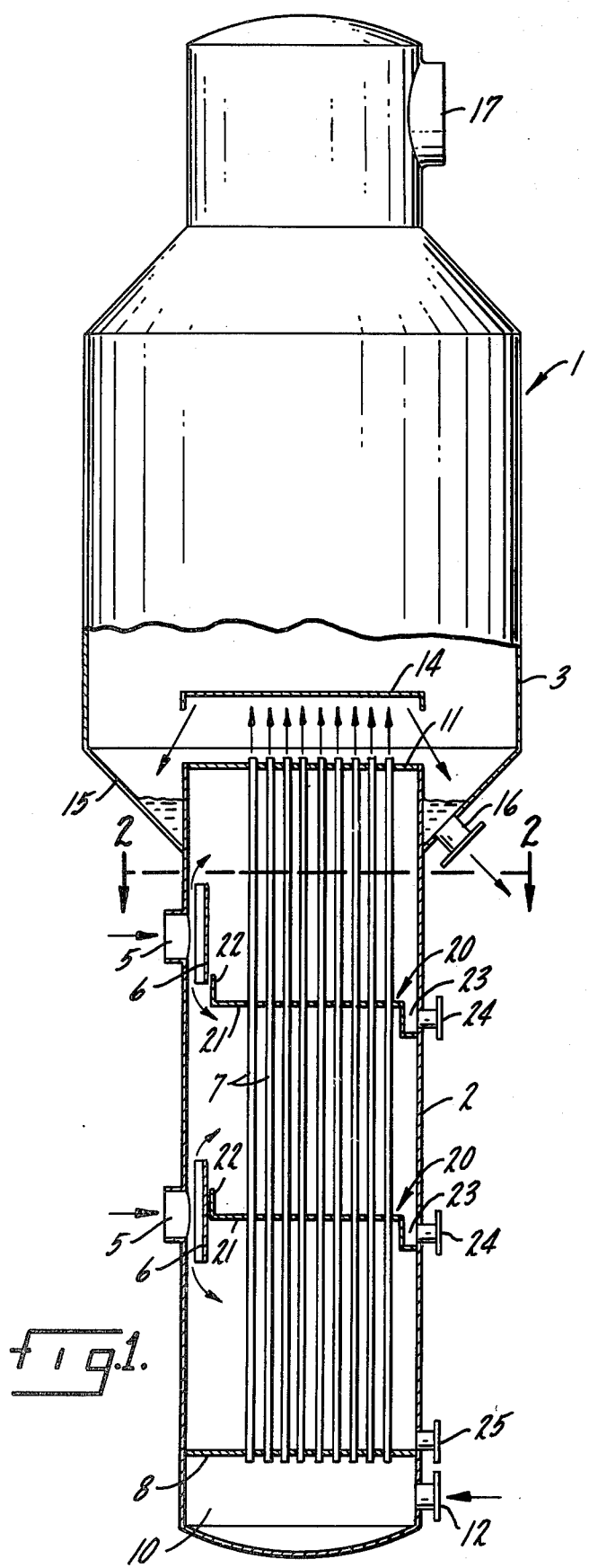
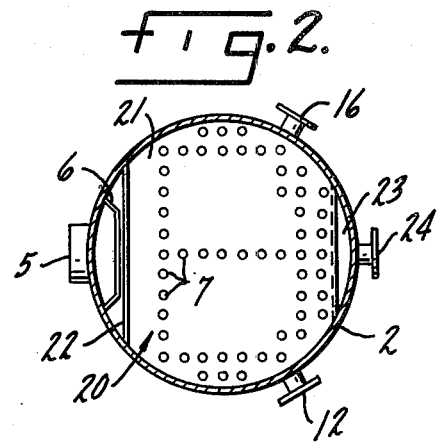
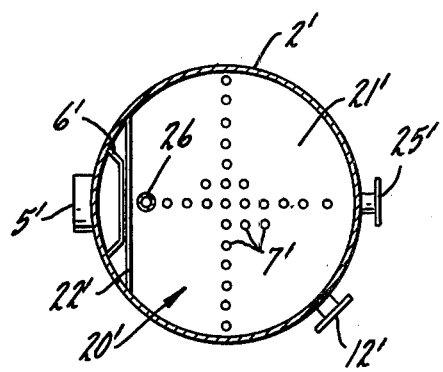
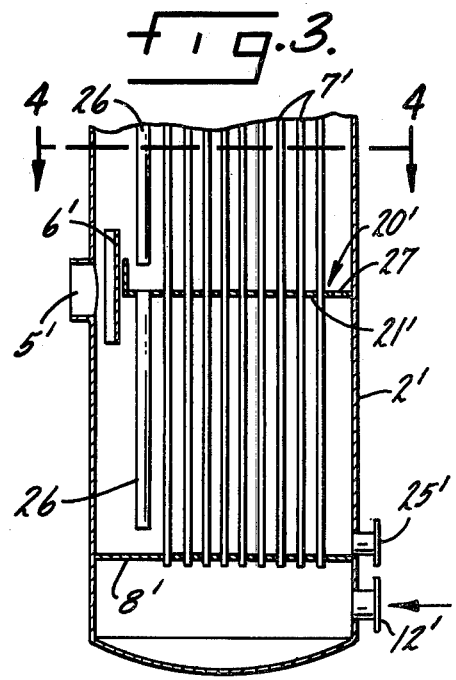

EVAPORATOR

BACKGROUND OF THE INVENTION

This invention relates to evaporators, and more particularly to an evaporator with increased heat transfer between the vapors being condensed and the liquid being evaporated. Such evaporators may be used, for example, to concentrate pulp and paper spent black liquor, and distillery or brewery solubles, to desalinate sea water, or to process chemicals such as ammonium nitrate. Evaporators may have either single or multiple effects.

Shop fabrication of evaporator containers is more economical than field erection, but the diameter of such bodies is limited by legal and physical restrictions on the diameter of objects which can be transported by a carrier vehicle. Therefore, evaporators are being constructed with relatively long tubes in order to maximize the heat transfer surface that can be packaged in a transportable shop-built container. Vertical tube evaporators have been made with tube lengths that range up to thirty-two feet. We have observed that when such tube lengths exceed about twenty feet, the increase in heat transferred is proportionately less than the increase in heat transfer surface. Also, there are legal and physical restrictions on the length of objects which can be transported by vehicle, so this limits the amount of evaporator capacity that can be added by increasing tube length.

SUMMMARY OF THE INVENTION

Accordingly, it is an object of this invention to provide an evaporator with improved heat transfer characteristics.

Another object is to provide high capacity apparatus for evaporating liquids which can be fabricated in a shop and transported by vehicle to the site where used.

Another object is to provide a long tube vertical evaporator in which the heat transferred by condensation of vapors is increased.

Another object is to provide an evaporator with reduced condensed vapor film thickness.

Another object is to provide liquid evaporation equipment which is relatively economical and which does not possess defects found in corresponding prior art devices.

Still other objects and advantages of this invention will be revealed in the specification and claims, and the scope of the invention will be set forth in the claims.

Briefly stated, according to one aspect of the invention, the average condensate film thickness on a long tube vertical evaporator is reduced by removal of such liquid film intermediate the length of the tubes, thereby increasing the heat transfer capacity of the evaporator.

DESCRIPTION OF THE DRAWINGS

FIG. 1 is a partially broken-away, schematic side view of a preferred embodiment of the invention.

FIG. 2 is a cross-sectional view taken along the line 2—2 in FIG. 1 with some of the tubes omitted.

FIG. 3 is a broken-away side view of another embodiment of the invention.

FIG. 4 is a cross-sectional view taken along the line 4—4 in FIG. 3 with most of the tubes omitted.

DESCRIPTION OF PREFERRED EMBODIMENTS

In the drawing, a long-tube, vertical, steelbodied, evaporator 1 has a condensation chamber 2 and a vaporization chamber 3. Evaporator 1 may be employed in conventional manner as one of the effects of a multiple effect evaporator installation. Hot vapors to be condensed enter chamber 2 through inlets 5 where their kinetic energy is dissipated by metal baffle plates 6 welded to the inside wall of chamber 2. Numerous long vertical heat transfer tubes 7 made from a suitable metal such as copper or stainless steel, occupy chamber 2. The diameter of tubes 7 is relatively small in relation to the diameter of chamber 2. The lower ends of tubes 7 are held by a tube sheet 8, which defines a sealed, liquid inlet chamber 10 for liquid to be evaporated. The upper ends of tubes 7 are held by the top wall 11 of chamber 2. Liquid to be evaporated is pumped or introduced by any conventional means into chamber 10 through inlet 12, and passes through tubes 7 where heat is transferred to it by vapors in chamber 2 that condense on tubes 7. The boiling liquid and its vapors exit from the upper ends of tubes 7 into chamber 3 where baffle plate 14 dissipates their kinetic energy. Unvaporized liquid runs into a trough 15 at the lower end of chamber 3 and exits through liquid outlet 16, while vaporized liquid rises to the top of chamber 3 where the vapors exit through vapor outlet 17.

The hot vapors in chamber 2 condense on tubes 7 as a liquid film that flows down the outside of such tubes. Once any liquid has condensed on the outside of tubes 7, the heat being transferred from the vapors in chamber 2 to the liquid inside tubes 7 must pass through such liquid film as well as through the walls of tubes 7. As the condensed liquid flows down the outside of tubes 7, the liquid film becomes thicker. We have discovered that when this film of condensed liquid becomes too thick, it impedes heat transfer and thus reduces the efficiency of the evaporator. As evaporator in accord with the teachings of our invention includes means for controlling the thickness of the film of condensed liquid flowing down the outside of heat transfer tubes 7. Our preferred way of controlling the condensed liquid film thickness is by intercepting such liquid at one or more locations spaced vertically along tubes 7, and thereby reducing the average thickness of the film. FIGS. 1 and 2 show how this can be accomplished by use of a pair of spaced, metal, condensed liquid collector vessels 20, each having a horizontal, perforated, bottom plate 21 through which the tubes 7 pass in a liquid-tight manner. Thus the film of liquid running down tubes 7 is stripped therefrom by plates 21. Each collector 20 has an upstanding end wall 22, and the edges of collectors 20 and end walls 22 are welded to the inside of chamber 2 so that a pool of condensed liquid can collect thereon. Each collector 20 has an integral trough 23 therebelow which communicates with an intermediate condensate outlet 24 so that condensed liquid that accumulates in collectors 20 can be withdrawn from the evaporator above the level of the bottom of chamber 2. Another condensate outlet 25 at the bottom of chamber 2 permits removal of condensed vapors that collect on tube sheet 8. The condensate film on tubes 7 will be thinnest adjacent top wall 11 and adjacent the underside of each collector 20. The film will be thickest as it enters the pools of liquid in collectors 20 and on tube sheet 8.

The number and spacing of condensate collectors 20 for reducing condensate film thickness on evaporator heat transfer tubes, will depend on variables existing in each system, such as temperature of the liquid being evaporated, temperature of the condensing vapors, local heat flux, viscosity, density, and thermal conductivity of the condensate, length and diameter of the heat transfer tubes, amount of vapor condensed on each tube, etc. In a commercial embodiment of a multiple effect evaporator, one effect was constructed essentially as shown in FIGS. 1 and 2. One hundred thousand pounds per hour of vapor entered chamber 2 at 280° F. to evaporate 98,080 lbs./hr. of water from 350,000 lbs./hr. of liquid which entered chamber 10 at 261° F. Tube sheet 8 and top wall 11 were 26 feet apart, and 1045 tubes 7 made of 304 stainless steel occupied chamber 2. Tubes 7 were 2 inches in diameter and had an average wall thickness of 0.049 inches. The diameter of chamber 2 was 8'-0-. There were three collectors 20 in chamber 2 and the collectors 20 were spaced six feet, seven feet and five feet, respectively, from the top wall 11. The average film thickness of the condensate on tubes 7 was $2.11 \times 10^{-4}$ feet. We have calculated that the average film thickness without the collectors 20 would have been $3.36 \times 10^{-4}$ feet. The steam film heat transfer coefficient of the evaporator was 2100 BTU/hr. sq. ft. ° F. and we have calculated that without the collectors 20 the steam film coefficient would have been 1323 BTU/hr. sq. ft. ° F. This increase in steam film coefficient increases the overall heat transfer coefficient for the evaporator effect by 11%.

FIGS. 3 and 4 show another embodiment of our invention in which liquid condensate in collectors 20' does not flow out of chamber 2' through discharge outlets in side wall. Instead, a relatively large pipe 26 is connected to each bottom plate 21' at its upper end, and carries liquid from the collector 20' either to the next lower collector or to the pool of liquid on tube sheet 8'. Another and similar method would be to use openings, such as 27, in plate 21, but omit pipe 26, allowing condensate to fall from plate to plate or to tube sheet 8. Thus the only condensed liquid discharge outlet needed is bottom outlet 25' at the level of tube sheet 8'. In all other respects, the structure and operation of the embodiment of FIG. 3 and 4 is the same as the embodiment of FIGS. 1 and 2.

While the present invention has been described with reference to particular embodiments, it is not intended to illustrate or describe all of the equivalent forms or ramifications thereof. For example, the invention is applicable to both single and multiple effect evaporator systems, and to falling film or forced circulation type evaporator, as well as the rising film type as is shown herein. Also the words used are words of description rather than limitation, and various changes may be made without departing from the spirit or scope of the invention disclosed herein. It is intended that the appended claims cover all such changes as fall within the true spirit and scope of the invention.

what is claimed is:

1. Apparatus for evaporating liquids comprising: a chamber having an inlet for hot vapors, an outlet adjacent the bottom of said chamber for discharge of condensed vapors, a plurality of cylindrical vertical tubes of relatively small diameter occupying said chamber so that said vapors contact the outside surface thereof, means for passing liquid through said vertical tubes, said liquid being heated and at least partially vaporized by heat transfer from said vapors which are condensed as a film which flows down the outside of said vertical tubes, means for receiving said heated liquid and its vapors, and horizontal plate means perpendicular to said vertical tubes, said horizontal plate having holes therein receiving and contacting said vertical tubes in liquid-tight maner so as to prevent any condensed vapors from coutinuing to flow beyond said horizontal plate means, said horizontal plate means being located above said outlet for removing the condensed vapors from said tubes so as to reduce the average thickness of said film and thereby increase the heat transferred between said hot vapors and liquid, said horizontal plate means being sealed at its edges to the inside wall of said chamber, an integral upstanding end wall of said horizontal plate means extending below the plate means defining a trough with the inside wall of the chamber for collecting condensed vapors from the plate means, said trough communicating with an intermediate condensate outlet for withdrawing condensate from the chamber at a level above said outlet adjacent the bottom of said chamber.

2. Multiple effect liquid evaporating apparatus, at least one effect of which comprises, a condensation chamber having an inlet for hot vapors, a condensed vapor outlet adjacent the bottom of said condensation chamber for discharge of condensed vapors, a plurality of cylindrical vertical tubes of relatively small diameter occupying said chamber so that said vapors contact the outside surface thereof, means below said condensation chamber defining an inlet chamber communicating with the lower end of said tubes for receiving relatively cool liquid, means for pumping such liquid through said tubes, said liquid being heated and at least partially vaporized by heat transfer from said vapors which are condensed as a liquid film which flows down the outside of said tubes, means connected to the upper end of said tubes defining an evaporation chamber receiving the heated liquid and its vapors, an outlet adjacent the bottom of said evaporation chamber for said heated liquid and an outlet adjacent the top of said evaporation chamber for its vapors, a horizontal plate in said condensation chamber perpendicular to said vertical tubes, said horizontal plate being located above said condensed vapor outlet, said horizontal plate being perforated by holes, said tubes passing in liquid-tight manner through the holes in said plate so that the condensed vapors are stripped from said tubes, thereby reducing the average thickness of said film, and increasing the heat transferred in said condensation chamber between said vapors and liquid, said horizontal plate means being sealed at its edges to the inside wall of said chamber, an integral upstanding end wall of said horizontal plate means extending below the plate means defining a trough with the inside wall of the chamber for collecting condensed vapors from the plate means, said trough communicating with an intermediate condensate outlet for withdrawing condensate from the chamber at a level above said outlet adjacent the bottom of said chamber.

* * * * *